(12) United States Patent
Seo et al.

(10) Patent No.: US 7,512,322 B2
(45) Date of Patent: Mar. 31, 2009

(54) RECORDING MEDIUM, METHOD, AND APPARATUS FOR REPRODUCING TEXT SUBTITLE STREAMS

(75) Inventors: Kang Soo Seo, Anyang-si (KR); Byung Jin Kim, Seongnam-si (KR); Jea Yong Yoo, Seoul (KR)

(73) Assignee: LG Electronics, Inc., Seoul (KR)

( * ) Notice: Subject to any disclaimer, the term of this patent is extended or adjusted under 35 U.S.C. 154(b) by 658 days.

(21) Appl. No.: 11/069,959

(22) Filed: Mar. 3, 2005

(65) Prior Publication Data

US 2005/0207737 A1  Sep. 22, 2005

(30) Foreign Application Priority Data

Mar. 17, 2004 (KR) ..................... 10-2004-0018091
Mar. 31, 2004 (KR) ..................... 10-2004-0022252

(51) Int. Cl.
*H04N 5/00* (2006.01)
*H04N 5/91* (2006.01)
*H04N 5/93* (2006.01)
*H04N 5/445* (2006.01)
*H04N 7/00* (2006.01)
*H04N 7/16* (2006.01)
*H04N 7/173* (2006.01)
*H04N 9/74* (2006.01)
*H04N 9/79* (2006.01)
*G05B 11/01* (2006.01)
*G05B 15/00* (2006.01)
*G11B 7/085* (2006.01)
*G06F 3/00* (2006.01)
*G09G 5/00* (2006.01)
*G10L 13/00* (2006.01)

(52) U.S. Cl. .................. 386/95; 386/45; 386/52; 386/69; 386/70; 386/98; 386/125; 386/126; 345/629; 348/143; 348/156; 348/461; 348/468; 348/564; 348/588; 369/30.09; 700/17; 700/18; 700/83; 700/86; 700/87; 704/260; 715/716; 715/723; 725/37; 725/55; 725/88; 725/90; 725/102; 725/132; 725/140; 725/152

(58) Field of Classification Search ............... 386/95, 386/125, E9.013, E5.1, E9.037, E11.021; 715/723

See application file for complete search history.

(56) References Cited

U.S. PATENT DOCUMENTS 5,253,530 A   10/1993   Letcher, III (Continued)

FOREIGN PATENT DOCUMENTS

CN          1348588          5/2002

(Continued)

OTHER PUBLICATIONS

Understanding SAMI 1.0, *Microsoft Corp*. XP007902747 (pub. Oct. 2001, updated Feb. 2003).

(Continued)

*Primary Examiner*—Thai Tran
*Assistant Examiner*—Syed Y Hasan
(74) *Attorney, Agent, or Firm*—Harness, Dickey & Pierce, PLC

(57) ABSTRACT

A recording medium, method, and apparatus for reproducing text subtitle streams are disclosed. A microcomputer initially reads a set of PlayItems and a SubPlayItem included in a PlayList which is recorded on a recording medium, and it further reads synchronization information included in the SubPlayItem. Each PlayItem is configured to reproduce at least one main AV stream, and the SubPlayItem is configured to reproduce a text subtitle stream. The synchronization information indicates a presentation start time of the SubPlayItem on a global time axis of the PlayList. When the PlayList is randomly accessed at a random access time on the global time axis, the microcomputer calculates a corresponding access time on a time axis of the SubPlayItem. Then a text subtitle decoder decodes for presentation a dialog presentation segment with the closest dialog start time after the corresponding access time on the axis of the SubPlayItem.

33 Claims, 16 Drawing Sheets

U.S. PATENT DOCUMENTS

| | | |
|---|---|---|
| 5,467,142 A | 11/1995 | Ichinokawa |
| 5,519,443 A | 5/1996 | Salomon et al. |
| 5,537,151 A | 7/1996 | Orr et al. |
| 5,758,007 A | 5/1998 | Kitamura et al. |
| 5,781,687 A | 7/1998 | Parks |
| 5,832,530 A | 11/1998 | Paknad et al. |
| 6,128,434 A | 10/2000 | Hirayama et al. |
| 6,173,113 B1 | 1/2001 | Okada et al. |
| 6,204,883 B1 | 3/2001 | Tsukagoshi |
| 6,219,043 B1 | 4/2001 | Yogeshwar et al. |
| 6,222,532 B1 | 4/2001 | Ceccarelli et al. |
| 6,230,295 B1 | 5/2001 | Watkins |
| 6,253,221 B1 | 6/2001 | Kim |
| 6,262,775 B1 | 7/2001 | Kim |
| 6,320,621 B1 | 11/2001 | Fu |
| 6,393,196 B1 | 5/2002 | Yamane et al. |
| 6,661,467 B1 | 12/2003 | Vam Der Meer et al. |
| 6,747,920 B2 | 6/2004 | Denda et al. |
| 7,151,617 B2 | 12/2006 | Fukushima et al. |
| 7,174,560 B1 | 2/2007 | Crinon |
| 7,188,353 B1 | 3/2007 | Crinon |
| 2002/0004755 A1 | 1/2002 | Balthaser |
| 2002/0010924 A1 | 1/2002 | Kalhour |
| 2002/0106193 A1 | 8/2002 | Park et al. |
| 2002/0135608 A1* | 9/2002 | Hamada et al. ............. 345/723 |
| 2002/0151992 A1 | 10/2002 | Hoffberg et al. |
| 2002/0159757 A1 | 10/2002 | Ando et al. |
| 2002/0194618 A1 | 12/2002 | Okada et al. |
| 2003/0039472 A1 | 2/2003 | Kim |
| 2003/0078858 A1 | 4/2003 | Angelopoulos et al. |
| 2003/0085997 A1 | 5/2003 | Takagi et al. |
| 2003/0099464 A1 | 5/2003 | Oh et al. |
| 2003/0147629 A1 | 8/2003 | Kikuchi et al. |
| 2003/0188312 A1 | 10/2003 | Bae et al. |
| 2003/0189571 A1 | 10/2003 | MacInnis et al. |
| 2003/0189669 A1 | 10/2003 | Bowser |
| 2003/0190147 A1 | 10/2003 | Lee |
| 2003/0194211 A1 | 10/2003 | Abecassis |
| 2003/0202431 A1 | 10/2003 | Kim et al. |
| 2003/0206553 A1 | 11/2003 | Surcouf et al. |
| 2003/0216922 A1 | 11/2003 | Gonzales et al. |
| 2003/0235402 A1 | 12/2003 | Seo et al. |
| 2003/0235406 A1 | 12/2003 | Seo et al. |
| 2004/0001699 A1 | 1/2004 | Seo et al. |
| 2004/0003347 A1 | 1/2004 | Saidenberg et al. |
| 2004/0027369 A1 | 2/2004 | Kellock et al. |
| 2004/0047605 A1 | 3/2004 | Seo et al. |
| 2004/0054771 A1 | 3/2004 | Roe et al. |
| 2004/0081434 A1 | 4/2004 | Jung et al. |
| 2004/0151472 A1 | 8/2004 | Seo et al. |
| 2005/0013207 A1 | 1/2005 | Tsumagari et al. |
| 2005/0105888 A1* | 5/2005 | Hamada et al. ............... 386/95 |
| 2005/0147387 A1 | 7/2005 | Seo et al. |
| 2006/0013563 A1 | 1/2006 | Adolph et al. |
| 2006/0098936 A1 | 5/2006 | Ikeda et al. |
| 2006/0156358 A1 | 7/2006 | Adolph et al. |
| 2006/0259941 A1 | 11/2006 | Goldberg et al. |

FOREIGN PATENT DOCUMENTS

| | | |
|---|---|---|
| CN | 1864220 | 11/2006 |
| EP | 0737016 | 10/1996 |
| EP | 0863509 | 9/1998 |
| EP | 0971536 | 1/2000 |
| EP | 0755161 | 10/2001 |
| EP | 1178691 | 2/2002 |
| EP | 1326451 | 7/2003 |
| GB | 1586431 | 3/1981 |
| JP | 09-102940 | 4/1997 |
| JP | 11-252518 | 9/1999 |
| JP | 2000-324395 | 11/2000 |
| JP | 2002-290895 | 10/2002 |
| JP | 2003-061098 | 2/2003 |
| JP | 2003-224826 | 8/2003 |
| JP | 2003-230136 | 8/2003 |
| KR | 10-2001-0001725 | 1/2001 |
| KR | 10-2002-0043812 | 6/2002 |
| KR | 10-2003-0030554 | 4/2003 |
| TW | 578068 | 3/2004 |
| WO | WO 03/105152 | 12/2003 |
| WO | WO 2005-034122 | 4/2005 |
| WO | WO 2005/045833 | 5/2005 |

OTHER PUBLICATIONS

Jakob Nielson's Alertbox for Jul. 1, 1997, "Effective Use of Style Sheets," www.useit.com/alertbox/9709a.html.
International Search Report dated Aug. 5, 2005.
Office Action for corresponding Taiwanese application dated Apr. 30, 2008.
Office Action for corresponding Chinese application dated Dec. 21, 2007 and English translation thereof.
Malaysian Office Action dated Nov. 14, 2008.

* cited by examiner

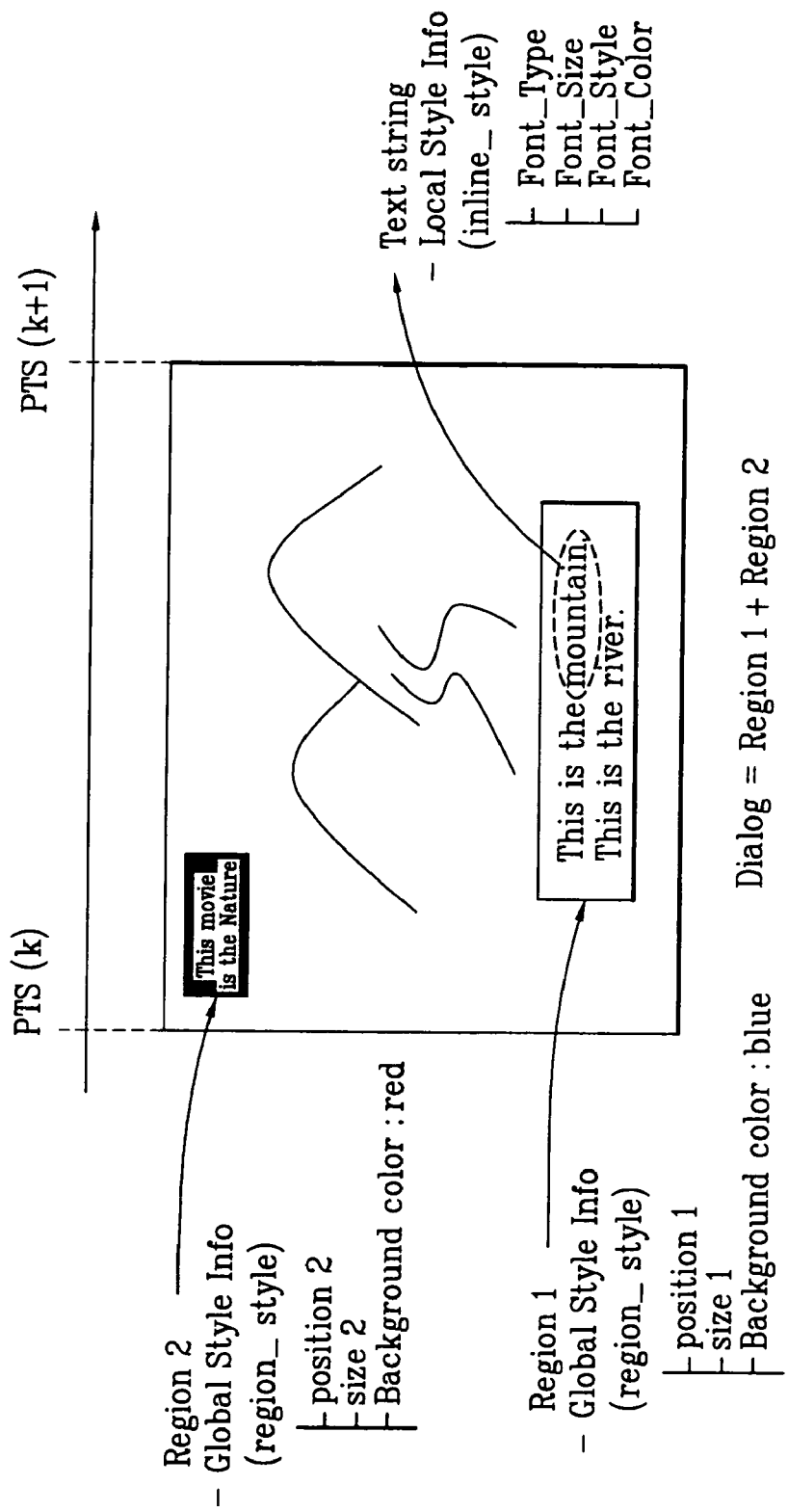

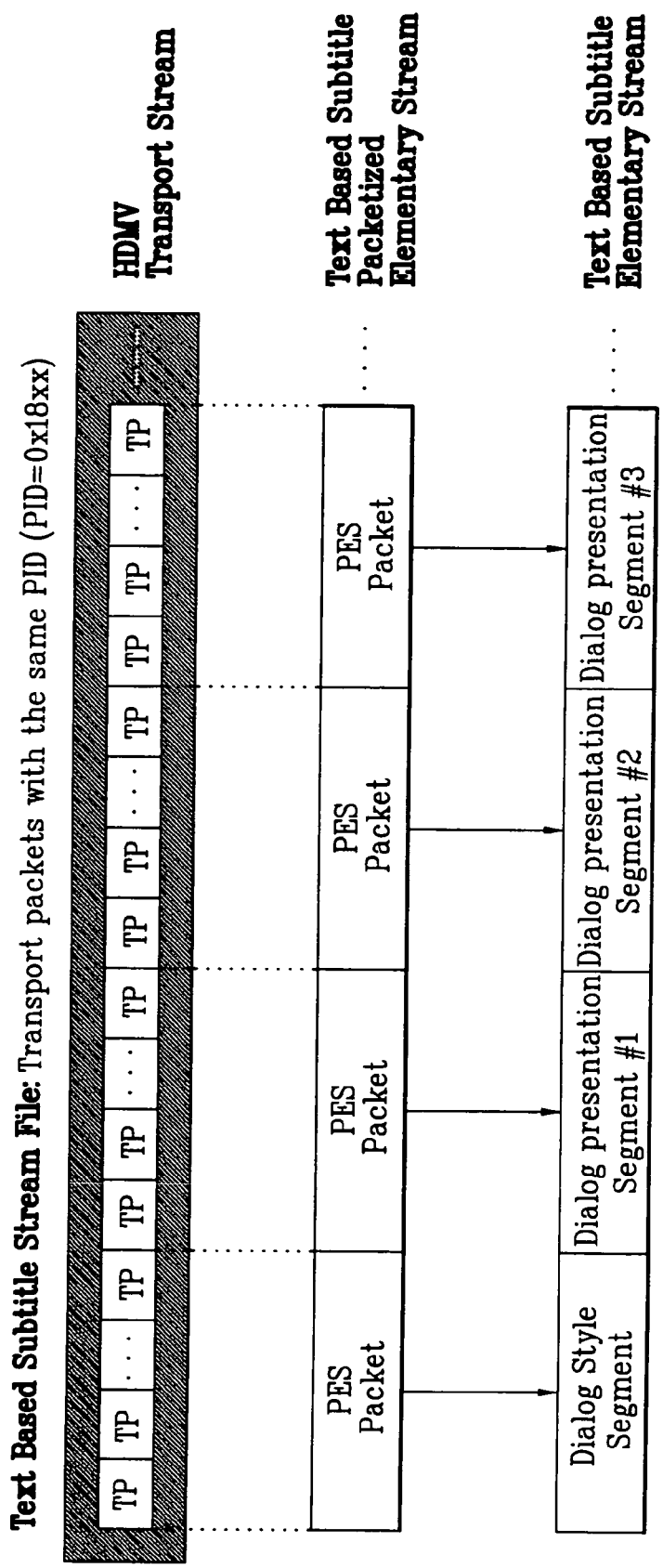

FIG. 8

```
Subpath(){
    length
    SubPath_type
    is_repeat_SubPath
    number_of_SubPlayItems
    for(i=0;i<number_of_SubPlayItems;i++){
        SubPlayItem(i)
    }
}

0 : reserved
    1 : reserved
    2 : Audio presentation path of
        the Browsable slideshow
    3 : Interactive graphic presentation menu
    4 : Text subtitle presentation path
    5~255 : reserved SubPlayItem(i){
    length
    Clip_information_file_name[0]
    Clip_codec_identifier[0]
    reserved_for_future_use
    is_multi_Clip_entries
    ref_to_STC_id[0]
    SubPlayItem_IN_time
    SubPlayItem_OUT_time
    sync_PlayItem_id
    sync_start_PTS_of_PlayItem
    if(is_multi_Clip_entries==1_b){
        reserved_for_future_use
        num_of_Clip_entries
        for(subclip_entry_id=1;
            subclip_entry_id<num_of_Clip_entries;
            subclip_entry_id++){
                Clip_information_file_name[subclip_entry_id]
                Clip_Codec_Identifier[subclip_entry_id]
                ref_to_STC_id[subclip_entry_id]
                reserved_for_future_use
        }
    }
}
```

RECORDING MEDIUM, METHOD, AND APPARATUS FOR REPRODUCING TEXT SUBTITLE STREAMS

This application claims the benefit of the Korean Patent Application No. 10-2004-0018091, filed on Mar. 17, 2004 and No. 10-2004-0022252, filed on Mar. 31, 2004, which are hereby incorporated by reference as if fully set forth herein.

BACKGROUND OF THE INVENTION

1. Field of the Invention

The present invention relates to a recording medium, and more particularly, to a recording medium, method, and apparatus for reproducing text subtitle streams. Although the present invention is suitable for a wide scope of applications, it is particularly suitable for recording the text subtitle stream file within the recording medium and effectively reproducing the recorded text subtitle stream.

2. Discussion of the Related Art

Optical discs are widely used as an optical recording medium for recording mass data. Presently, among a wide range of optical discs, a new high-density optical recording medium (hereinafter referred to as "HD-DVD"), such as a Blu-ray Disc (hereafter referred to as "BD"), is under development for writing and storing high definition video and audio data. Currently, global standard technical specifications of the Blu-ray Disc (BD), which is known to be the next generation technology, are under establishment as a next generation optical recording solution that is able to have a data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since the standards of the supplementary data, particularly the subtitle stream file, are not completely consolidated, there are many restrictions in the full-scale development of a Blu-ray Disc (BD) basis optical reproducing apparatus. And, such restrictions cause problems in providing the supplementary data such as subtitles to the user.

SUMMARY OF THE INVENTION

Accordingly, the present invention is directed to a recording medium, method, and apparatus for reproducing text subtitle streams that substantially obviate one or more problems due to limitations and disadvantages of the related art.

An object of the present invention is to provide a method and apparatus for recording text subtitle streams in a recording medium, such as a blu-ray disc, and to provide a method and apparatus for reproducing the recorded text subtitle streams.

Another object of the present invention is to provide a method of creating time information when recording text subtitle streams on a recording medium.

A further object of the present invention is to provide a method and apparatus for reproducing text subtitle streams that can effectively reproduce the text subtitle streams.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium for reproducing text subtitle streams includes a first data area storing a PlayList, the PlayList containing a set of PlayItems and a SubPlayItem, each PlayItem being configured to reproduce at least one main AV stream, the SubPlayItem being configured to reproduce a text subtitle stream, the SubPlayItem containing synchronization information which indicates a presentation start time of the SubPlayItem on a global time axis of the PlayList, and a second data area storing the at least one main AV stream and the text subtitle stream, wherein if the PlayList is randomly accessed at a random access time on the global time axis, a dialog presentation segment with the closest dialog start time after a corresponding random access time on a time axis of the SubPlayItem is presented.

In another aspect of the present invention, a method for reproducing text subtitle streams includes reading a set of PlayItems and a SubPlayItem included in a PlayList recorded on a recording medium, each PlayItem being configured to reproduce at least one main AV stream, the SubPlayItem being configured to reproduce a text subtitle stream, reading synchronization information included in the SubPlayItem, the synchronization information indicating a presentation start time of the SubPlayItem on a global time axis of the PlayList, and if the PlayList is randomly accessed at a random access time on the global time axis, presenting a dialog presentation segment with the closest dialog start time after a corresponding random access time on a time axis of the SubPlayItem.

In another aspect of the present invention, an apparatus for reproducing text subtitle streams includes a microcomputer configured to read a set of PlayItems and a SubPlayItem included in a PlayList recorded on a recording medium, and to read synchronization information included in the SubPlayItem, each PlayItem being configured to reproduce at least one main AV stream, the SubPlayItem being configured to reproduce a text subtitle stream, the synchronization information indicating a presentation start time of the SubPlayItem on a global time axis of the PlayList, and a text subtitle decoder coupled to the microcomputer for decoding the text subtitle stream, wherein if the PlayList is randomly accessed at a random access time on the global time axis, the text subtitle decoder decodes a dialog presentation segment with the closest dialog start time after a corresponding random access time on a time axis of the SubPlayItem.

In a further aspect of the present invention, a method for reproducing text subtitle streams includes reading a set of PlayItems and a SubPlayItem included in a PlayList recorded on a recording medium, each PlayItem being configured to reproduce at least one main AV stream, the SubPlayItem being configured to reproduce a text subtitle stream loaded into a buffer, reading synchronization information included in the SubPlayItem, the synchronization information indicating a presentation start time of the SubPlayItem on a global time axis of the PlayList, when the PlayList is randomly accessed at a random access time on the global time axis, calculating its corresponding random access time on a time axis of the SubPlayItem, selecting a data location from an entry point (EP) map, the selected data location corresponding to a presentation time stamp which is equal to or immediate after the calculated random access time on the time axis of the SubPlayItem, and presenting a dialog presentation segment stored in the selected data location within the buffer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 5A to 5C illustrate applications of the reproduction control information for reproducing the text subtitle stream according to the present invention;

FIG. 7 illustrates a structure of the text subtitle stream according to the present invention;

FIG. 8 illustrates a set of SubPath information among reproduction control file information for controlling reproduction of the text subtitle stream according to the present invention;

DETAILED DESCRIPTION OF THE INVENTION

Figure 1:
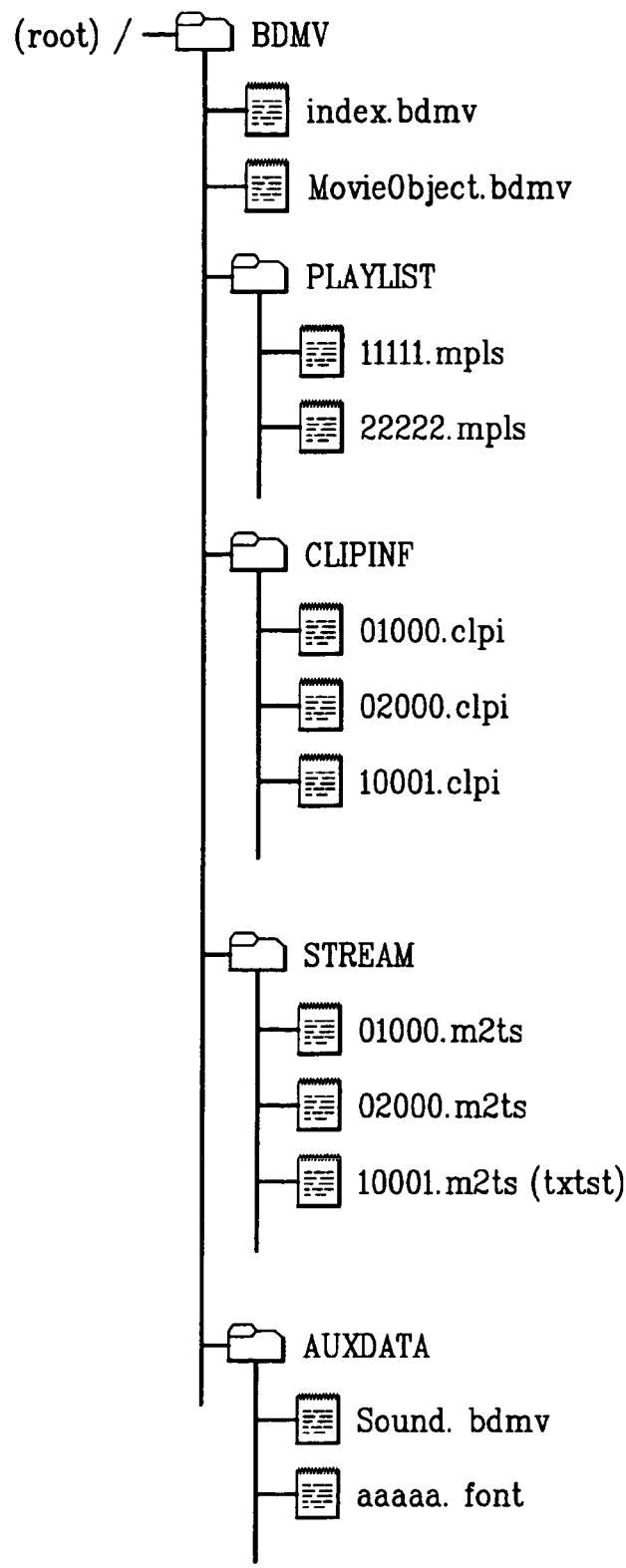
FIG. 1 illustrates a structure of data files recorded in a high density optical disc according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

In this detailed description, "main data" represent audio/video (AV) data that belong to a title (e.g., a movie title) recorded in an optical disc by an author. In general, the AV data are recorded in MPEG2 format and are often called AV streams or main AV streams. In addition, "supplementary data" represent all other data required for reproducing the main data, examples of which are text subtitle streams, interactive graphic streams, presentation graphic streams, and supplementary audio streams (e.g., for a browsable slideshow). These supplementary data streams may be recorded in MPEG2 format or in any other data format. They could be multiplexed with the AV streams or could exist as independent data files within the optical disc.

A "subtitle" represents caption information corresponding to video (image) data being reproduced, and it may be represented in a predetermined language. For example, when a user selects an option for viewing one of a plurality of subtitles represented in various languages while viewing images on a display screen, the caption information corresponding to the selected subtitle is displayed on a predetermined portion of the display screen. If the displayed caption information is text data (e.g., characters), the selected subtitle is often called a "text subtitle". According to one aspect of the present invention, a plurality of text subtitle streams in MPEG2 format may be recorded in an optical disc, and they may exist as a plurality of independent stream files. Each "text subtitle stream file" is created and recorded within an optical disc. And, the purpose of the present invention is to provide a method and apparatus for reproducing the recorded text subtitle stream file. Most particularly, by synchronizing the text subtitle stream with the main data (AV stream), the present invention proposes a method of providing to the users a text subtitle stream synchronized with the main data (AV stream) and a method of enabling random access.

FIG. 1 illustrates a file structure of the data files recorded in a Blu-ray disc (hereinafter referred to as "BD") according to the present invention. Referring to FIG. 1, at least one BD directory (BDMV) is included in a root directory (root). Each BD directory includes an index file (index.bdmv) and an object file (MovieObject.bdmv), which are used for interacting with one or more users. For example, the index file may contain data representing an index table having a plurality of selectable menus and movie titles. Each BD directory further includes four file directories that; include audio/video (AV) data to be reproduced and various data required for reproduction of the AV data.

The file directories included in each BD directory are a stream directory (STREAM), a clip information directory (CLIPINF), a playlist directory (PLAYLIST), and an auxiliary data directory (AUX DATA). First of all, the stream directory (STREAM) includes audio/video (AV) stream files having a particular data format. For example, the AV stream files may be in the form of MPEG2 transport packets and be named as "*.m2ts", as shown in FIG. 1. The stream directory may further include one or more text subtitle stream files, where each text subtitle stream file includes text (e.g., characters) data for a text subtitle represented in a particular language and reproduction control information of the text data. The text subtitle stream files exist as independent stream files within the stream directory and may be named as "*.m2ts" or "*.txtst", as shown in FIG. 1. An AV stream file or text subtitle stream file included in the stream directory is often called a clip stream file.

Next, the clip information directory (CLIPINF) includes clip information files that correspond to the stream files (AV or text subtitle) included in the stream directory, respectively. Each clip information file contains property and reproduction timing information of a corresponding stream file. For example, a clip information file may include mapping information, in which presentation time stamps (PTS) and source packet numbers (SPN) are in a one-to-one correspondence and are mapped by an entry point map (EPM), depending upon the clip type. Accordingly, examples of mapping information being included and not included in the ClipInfo file (*.clpi), which is related to the text subtitle stream, according to the present invention will each be described in detail in a later process with reference to FIG. 10A to FIG. 11.

Using the mapping information, a particular location of a stream file may be determined from a set of timing information (In-Time and Out-Time) provided by a PlayItem or SubPlayItem, which will be discussed later in more details. In the industry standard, each pair of a stream file and its corresponding clip information file is designated as a clip. For example, 01000.clpi included in CLIPINF includes property and reproduction timing information of 01000.m2ts included in STREAM, and 01000.clpi and 01000.m2ts form a clip.

Referring back to FIG. 1, the playlist directory (PLAYLIST) includes one or more PlayList files (*.mpls), where each PlayList file includes at least one PlayItem that designates at least one main AV clip and the reproduction time of the main AV clip. More specifically, a PlayItem contains information designating In-Time and Out-Time, which represent reproduction begin and end times for a main AV clip designated by Clip_Information_File_Name within the PlayItem. Therefore, a PlayList file represents the basic reproduction control information for one or more main AV clips. In addition, the PlayList file may further include a SubPlayItem, which represents the basic reproduction control information for a text subtitle stream file. When a SubPlayItem is included in a PlayList file to reproduce one or more text subtitle stream files, the SubPlayItem is synchronized with the PlayItem(s). On the other hand, when the SubPlayItem is used to reproduce a browsable slideshow, it may not be synchronized with the PlayItem(s). According to the present invention, the main function of a SubPlayItem is to control reproduction of one or more text subtitle stream files.

Accordingly, a main path refers to a path reproducing the main data by using at least one PlayItem included in a PlayList file, and a sub path refers to a path reproducing the text subtitle stream as the supplementary data. More specifically, a main path must be included in a PlayList file, and at least one sub path for each attribute of a corresponding set of supplementary data is included, when the supplementary data exist. Thus, a reproduction using the main path and the sub path will be described in detail in a later process with reference to FIG.

4. Lastly, the auxiliary data directory (AUX DATA) may include supplementary data stream files, examples of which are font files (e.g., aaaaa.font or aaaaa.otf), pop-up menu files (not shown), and sound files (e.g., Sound.bdmv) for generating click sound. The text subtitle stream files mentioned earlier may be included in the auxiliary data directory instead of the stream directory.

Figure 2:
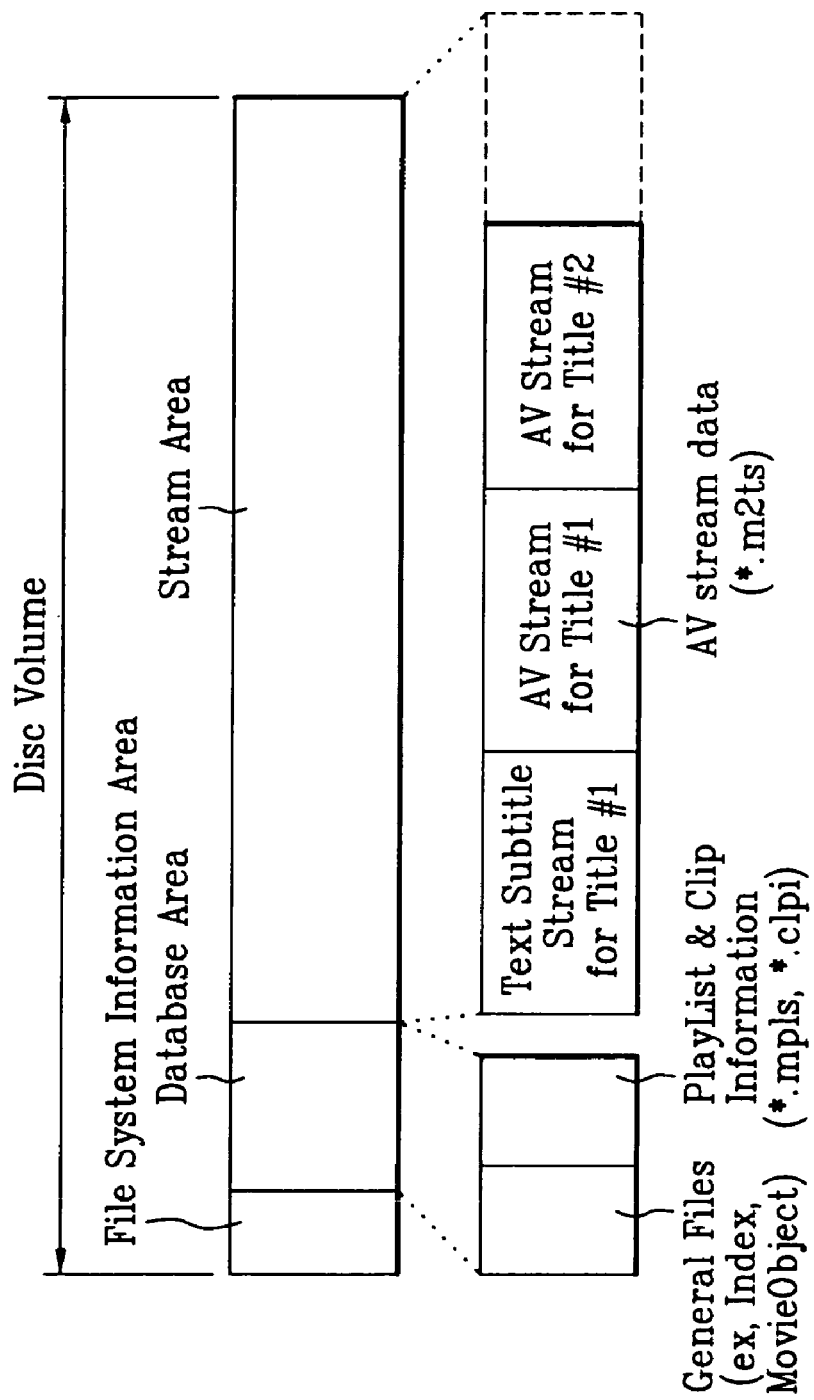
FIG. 2 illustrates data storage areas of the high density optical disc according to the present invention.

FIG. 2 illustrates data storage areas of an optical disc according to the present invention. Referring to FIG. 2, the optical disc includes a file system information area occupying the inmost portion of the disc volume, a stream area occupying the outmost portion of the disc volume, and a database area occupied between the file system information area and the stream area. In the file system information area, system information for managing the entire data files shown in FIG. 1 is stored. Next, main data and supplementary data (i.e., AV streams and one or more text subtitle streams) are stored in the stream area. The main data may include audio data, video data, and graphic data. And, the supplementary data (i.e., the text subtitle) is independently stored in the stream area without being multiplexed with the main data. The general files, PlayList files, and clip information files shown in FIG. 1 are stored in the database area of the disc volume. As discussed above, the general files include an index file and an object file, and the PlayList files and clip information files include information required to reproduce the AV streams and the text subtitle streams stored in the stream area. Using the information stored in the database area and/or stream area, a user is able to select a specific playback mode and to reproduce the main AV and text subtitle streams in the selected playback mode.

Figure 3:
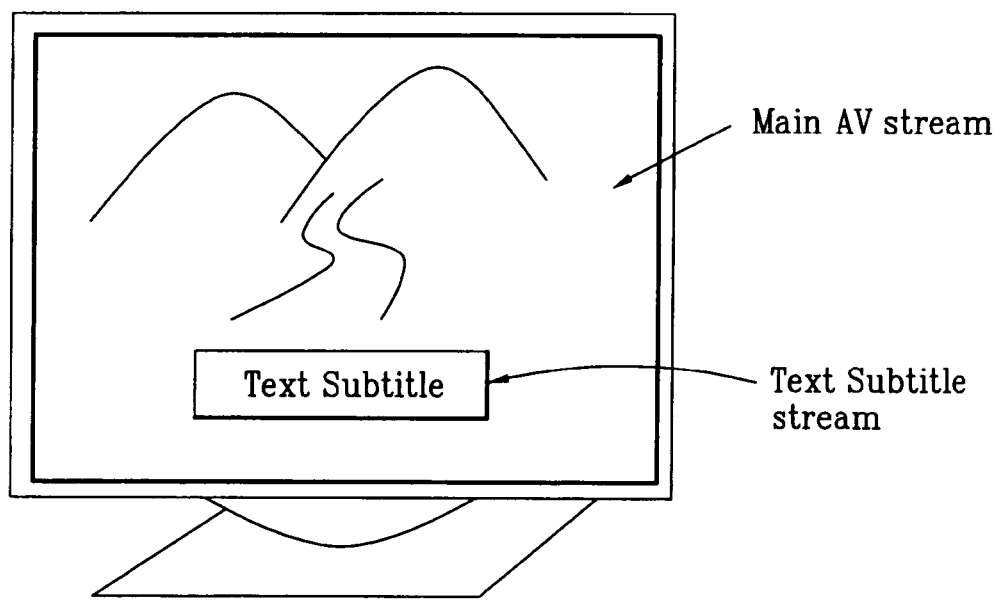
FIG. 3 illustrates a text subtitle and a main image presented on a display screen according to the present invention.

Hereinafter, the structure of the text subtitle stream file according to the present invention will be described in detail. First of all, the control information for reproducing the text subtitle stream will be newly defined. Then, the detailed description of the method of creating the text stream file including the newly defined control information, and the method and apparatus of reproducing the text subtitle stream for reproducing the recorded stream file will follow. FIG. 3 illustrates a text subtitle and a main image presented on a display screen according to the present invention. The main image and the text subtitle are simultaneously displayed on the display screen when a main AV stream and a corresponding text subtitle stream are reproduced in synchronization. Accordingly, the text subtitle stream must be provided by being synchronized in the main data, and the method of synchronizing the text subtitle stream with the main data will be proposed in the present invention.

Figure 4:
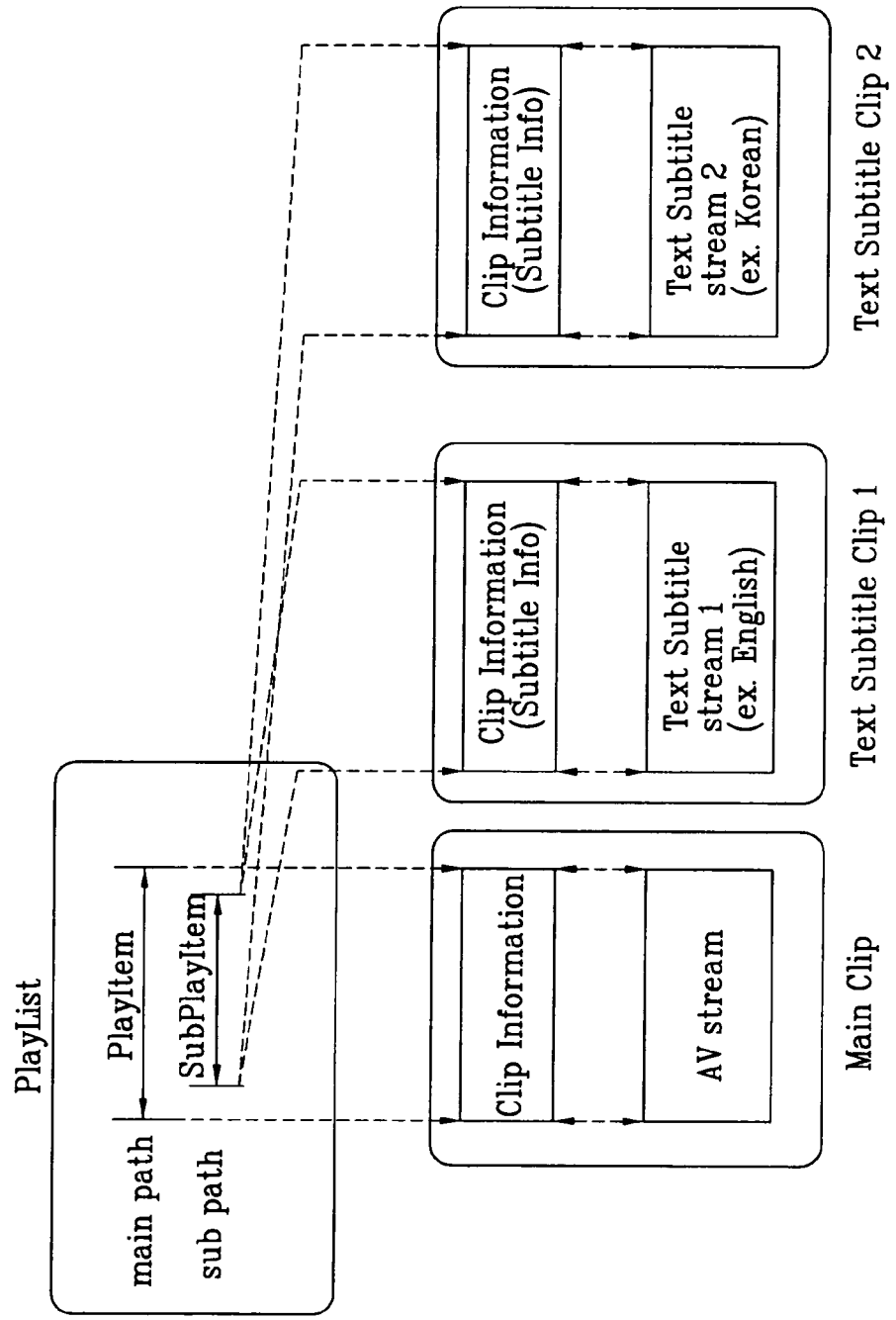
FIG. 4 illustrates a schematic diagram illustrating reproduction control of a text subtitle stream according to the present invention.

FIG. 4 is a schematic diagram illustrating reproduction control of a main AV clip and text subtitle clips according to the present invention. Referring to FIG. 4, a PlayList file includes at least one PlayItem controlling reproduction of at least one main AV clip and a SubPlayItem controlling reproduction of a plurality of text subtitle clips. More specifically, at least one PlayItem is included in the PlayList file as a main path for controlling reproduction of the main data (i.e., main clip). And, when a corresponding text subtitle stream exists within the main data, the text subtitle stream is controlled by a SubPlayItem as the sub path. For example, referring to FIG. 4, a text subtitle clip 1 (English) and a text subtitle clip 2 (Korean) are each reproduced and controlled by a single SubPlayItem. And, each of the text subtitle clip 1 and the text subtitle clip 2 is synchronized with the main data, thereby enabling the text subtitle and the main data to be displayed on a display screen simultaneously at a desired presentation time.

Figure 5A:
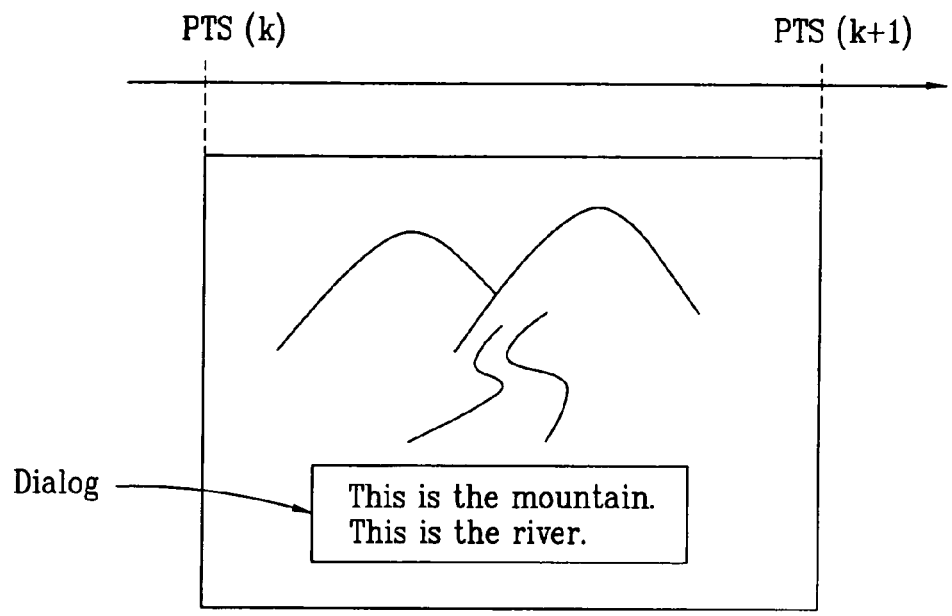
Figure 5B:
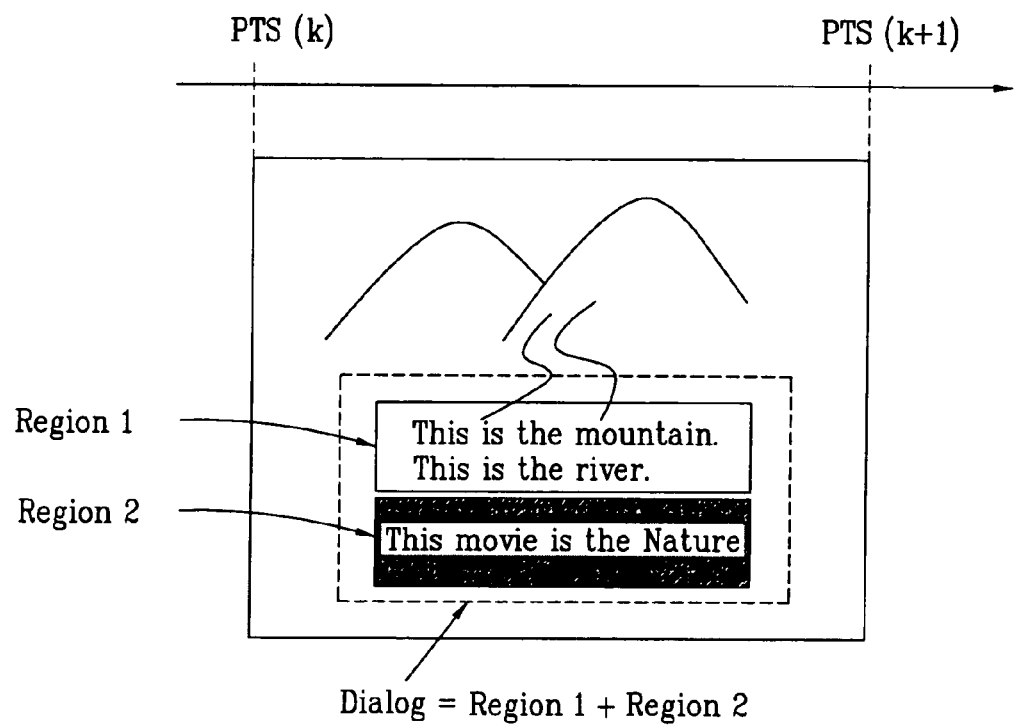

In order to display the text subtitle on the display screen, display control information (e.g., position and size information) and presentation time information, examples of which are illustrated in FIG. 5A to FIG. 5C, are required. Hereinafter, diverse information included in the text subtitle stream will be described in detail with reference to FIG. 5A to FIG. 7. And, the method of synchronizing the text subtitle stream with the main data and enabling random access will be described in detail with reference to FIG. 8 to FIG. 11.

FIG. 5A illustrates a dialog presented on a display screen according to the present invention. A dialog represents entire text subtitle data displayed on a display screen during a given presentation time, so as to facilitate reproduction control of the text subtitle stream. In general, presentation times of the dialog may be represented in presentation time stamps (PTS). More specifically, a PTS section for reproducing one dialog includes a "dialog_start_PTS" and a "dialog_end_PTS" for each dialog. Also, for example, presentation of the dialog shown in FIG. 5A starts at PTS (k) (i.e., dialog_start_PTS) and ends at PTS (k+1) (i.e., dialog_end_PTS). Therefore, when the dialog shown in FIG. 5A represents an entire unit of text subtitle data which are displayed on the display screen between PTS (k) and PTS (k+1), all of the text subtitle data is defined by the same dialog. Herein, a dialog includes a maximum of 100 character codes in one text subtitle.

In addition, FIG. 5B illustrates regions of a dialog according to the present invention. A region represents a divided portion of text subtitle data (dialog) displayed on a display screen during a given presentation time. In other words, a dialog includes at least one region, and each region may include at least one line of subtitle text. The entire text subtitle data representing a region may be displayed on the display screen according to a region style (global style) assigned to the region. The maximum number of regions included in a dialog should be determined based on a desired decoding rate of the subtitle data because the greater number of regions generally results in a lower decoding ratio. For example, the maximum number of regions for a dialog may be limited to two in order to achieve a reasonably high decoding rate.

FIG. 5C illustrates style information for regions of a dialog according to the present invention. Style information represents information defining properties required for displaying at least a portion of a region included in a dialog. Some of the examples of the style information are position, region size, background color, text alignment, text flow information, and many others. The style information may be classified into region style information (global style information) and inline style information (local style information).

Region style information defines a region style (global style) which is applied to an entire region of a dialog. For example, the region style information may contain at least one of a region position, region size, font color, background color, text flow, text alignment, line space, font name, font style, and font size of the region. For example, two different region styles are applied to region 1 and region 2, as shown in FIG. 5C. A region style with position 1, size 1, and blue background color is applied to Region 1, and a different region style with position 2, size 2, and red background color is applied to Region 2.

On the other hand, inline style information defines an inline style (local style) which is applied to a particular portion of text strings included in a region. For example, the inline style information may contain at least one of a font type, font size, font style, and font color. The particular portion of text strings may be an entire text line within a region or a particular portion of the text line. Referring to FIG. 5C, a particular inline style is applied to the text portion "mountain" included in Region 1. In other words, at least one of the font type, font size, font style, and font color of the particular portion of text strings is different from the remaining portion of the text strings within Region 1.

Figure 6:
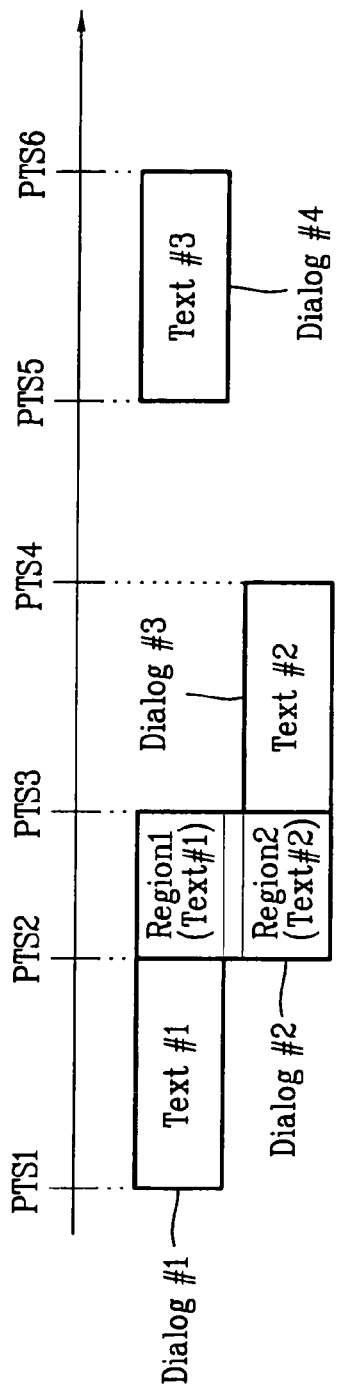
FIG. 6 illustrates a dialog, which forms a text subtitle stream according to the present invention, and its relation with a presentation time.

FIG. 6 illustrates a method of creating each dialog applied to each presentation time (PTS) section. For example, when 4 dialogs exist between PTS1 to PTS6, Dialog #1 is displayed as text data Text #1 between PTS1 and PTS2. And, Dialog #2 includes 2 regions (Region 1 and Region 2) between PTS2 and PTS3, wherein Region 1 is displayed as text data Text #1 and Region 2 is displayed as text data Text #2. Further, Dialog #3 is displayed as text data Text #2 between PTS3 and PTS4, and Dialog #4 is displayed as text data Text #3 between PTS5 and PTS6. Referring to FIG. 6, text subtitle data does not exist between PTS4 and PTS5. In the method for creating each of the above-described dialog information, each of the dialogs must include timing information (i.e., PTS set) for displaying the corresponding dialog, style information, and actual text data (hereinafter referred to as "dialog data").

Accordingly, as described above, the timing information (i.e., PTS set) being displayed is recorded as "dialog_start_PTS" and "dialog_end_PTS". The style information is defined as the above-described Global_Style_Info and Local_Style_Info. However, in the present invention, the style information will be recorded as region_styles and inline_styles. Furthermore, text data that is displayed on the actual display screen is recorded in the dialog data. More specifically, since Dialog #2 includes 2 regions (Region 1 and Region 2), a set of style information and dialog data is recorded for each of Region 1 and Region 2.

FIG. 7 illustrates a text subtitle stream file (e.g., 10001.m2ts shown in FIG. 1) according to the present invention. The text subtitle stream file may be formed of an MPEG2 transport stream including a plurality of transport packets (TP), all of which have a same packet identifier (e.g., PID=0x18xx). When a disc player receives many input streams including a particular text subtitle stream, it finds all the transport packets that belong to the text subtitle stream using their PIDs. Referring to FIG. 7, each sub-set of transport packets form a packet elementary stream (PES) packet. One of the PES packets shown in FIG. 7 corresponds to a dialog style segment (DSS) defining a group of region styles. All the remaining PES packets after the second PES packet correspond to dialog presentation segments (DPSs).

In the above-described text subtitle stream structure of FIG. 7, each of the dialog information shown in FIGS. 5A to 5C and FIG. 6 represent a dialog presentation segment (DPS). And, the style information included in the dialog information represents a set of information that links any one of the plurality of region style sets defined in the dialog style segment (DSS), which can also be referred to as "region_style_id", and inline styles. A standardized limited number of region style sets is recorded in the dialog style segment (DSS). For example, a maximum of 60 sets of specific style information is recorded, each of which is described by a region_style_id.

FIG. 8 illustrates a syntax structure of a sub path and a SubPlayItem according to the present invention. Herein, the sub path and the SubPlayItem are not used to control reproduction of the text subtitle stream only. Rather, an object of the sub path and the SubPlayItem is to define and reproduce diverse supplementary data including the text subtitle stream, depending upon the sub path type, which will be described in a later process. Therefore, a specific field within the syntax structure of the sub path and the SubPlayItem will be defined to have a specific value, when the specific field is irrelevant to the text subtitle stream or when the specific field is used in the text subtitle stream.

More specifically, referring to FIG. 8, a SubPath( ) syntax designates a path of the supplementary data that is associated with the main data included in a single PlayList. The SubPath( ) syntax includes a SubPath_type field, an is_repeat_SubPath field, a number_of_SubPlayItems field, and a SubPlayItem(i) field. Herein, the SubPath_type field designates the type of a sub path. SubPath_type=2 represents a supplementary audio browsable slideshow, SubPath_type=3 represents an interactive graphic presentation menu, and SubPath_type=4 represents a text subtitle presentation. Therefore, the optical recording and reproducing apparatus according to the present invention can determined which type of clip is being controlled by each corresponding sub path through the SubPath_type field. Also, the number_of_SubPlayItems field represents the number of SubPlayItems included within the sub path. Herein, the optical recording and reproducing apparatus can verify the number of SubPlayItems that are being controlled in the specific sub path through the number_of_SubPlayItems field. The is_repeat_SubPath field represents a set of 1-byte flag information for verifying whether the corresponding SubPath is to be used repeatedly. More specifically, when is_repeat_SubPath=0b the SubPath is not used repeatedly, and when is_repeat_SubPath=1b the SubPath is used repeatedly.

Accordingly, when controlling reproduction of the text subtitle stream by using the SubPath, SubPath_type=4, number_of_SubPlayItems=1, and is_repeat_SubPath=0b. In other words, in the SubPath controlling the text subtitle stream, a single SubPlayItem controls reproduction of a plurality of text subtitle streams (e.g., as shown in FIG. 4), and the SubPath is not used repeatedly. Therefore, when reproducing the supplementary audio browsable slideshow as SubPath_type=2, and when reproducing the interactive graphic presentation menu stream as SubPath_type=3, the number_of_SubPlayItems field and the is_repeat_SubPath field may be defined differently and used.

In addition, a detailed syntax of the SubPlayItem(i) field will now be described. A Clip_Information_file_name field is used as information designating a file name of a stream that is controlled by the corresponding SubPlayItem, and a Clip_codec_identifier field represents a coding format of the designated clip. As described above, since the text subtitle information according to the present invention is encoded in an MPEG-2 format, the Clip_codec_identifier field is defined as Clip_codec_identifier=M2TS. Also, a SubPlayItem_IN_time field and a SubPlayItem_OUT_time field are used as information for designating the reproduction begin time and reproduction end time within the designated clip. Accordingly, as described in FIG. 1, the SubPlayItem_IN_time and the SubPlayItem_OUT_time are changed to a set of address information (also referred to as a source packet number (SPN)) within the designated ClipInfo file (*.clpi), so as to decide the reproduction section within the actual clip. Further, a ref_to_STC_id field represents information deciding a position of a seamless reproduction unit, which is applied to the reproduction section, within the designated clip. Accordingly, the text subtitle stream forms a seamless reproduction unit by using a single system time clock (STC), which is also referred to as "1 STC_sequence".

An is_multi_clip_entries field is a set of 1-byte flag information representing a number of clip entries being controlled by the corresponding SubPlayItem. For example, referring to FIG. 4, since a plurality of clips exists when 2 text subtitle clips are controlled by a single SubPlayItem, is_multi_clip_entries=1b. Therefore, when is_multi_clip_entries=1b, at least 2 clip entries exist, and in this case, a subclip_entry_id is assigned to each clip entry, and a specific Clip_Information_file_name field, Clip_codec_identifier field and a ref_to_STC_id field for each subclip_entry_id are defined.

Finally, a set of information for synchronization with the main data is included within the SubPlayItem syntax, wherein the information includes a sync_PlayItem_id field and a sync_start_PTS_of_PlayItem field. More specifically, the sync_PlayItem_id field and the sync_start_PTS_of_PlayItem field are used only when reproduction control of the text subtitle stream is performed by using the SubPlayItem. Therefore, when reproducing the supplementary audio browsable slideshow as SubPath_type=2, and when reproducing the interactive graphic presentation menu stream as SubPath_type=3, the sync_PlayItem_id field and the sync_start_PTS_of_PlayItem field become unnecessary information, and in this case, the corresponding field is set as '00h'.

Figure 9A:
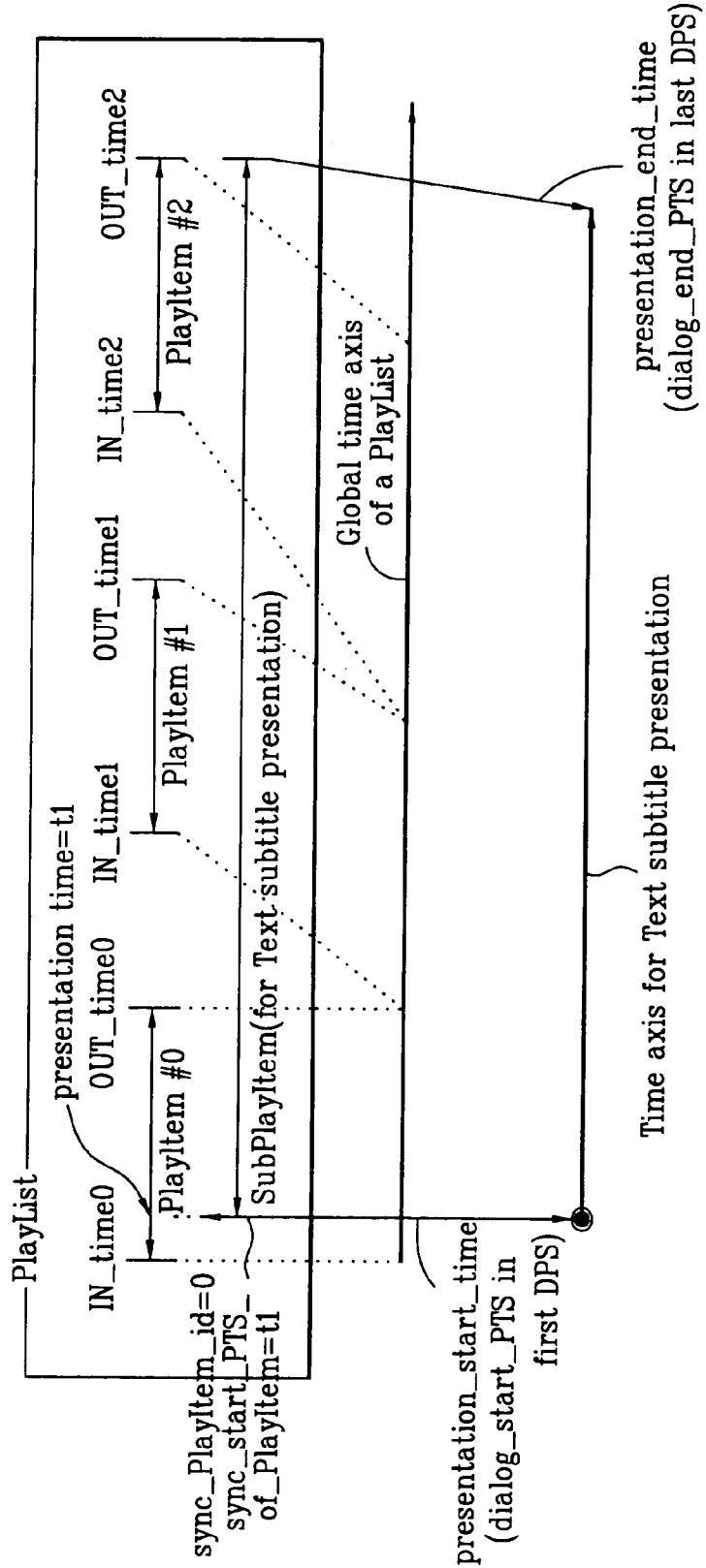
FIG. 9A illustrates a method of synchronizing the text subtitle stream and a main AV stream according to the present invention.

In describing the sync_PlayItem_id field and the sync_start_PTS_of_PlayItem field, the sync information for reproducing the text subtitle stream according to the present invention will now be described with reference to FIG. 9A and FIG. 9B. First of all, the text subtitle stream is synchronized with the main data, and the reproduction begin time of the text subtitle stream being synchronized with the main data is decided by the sync_PlayItem_id field and the sync_start_PTS_of_PlayItem field. More specifically, the sync_PlayItem_id field is a set of information designating a specific PlayItem among at least one PlayItems within the PlayList file. And, the sync_start_PTS_of_PlayItem field is a set of information indicating the reproduction begin time of the text subtitle stream as a PlayItem PTS, within the designated specific PlayItem. For example, referring to FIG. 9A, in the SubPlayItem for reproducing the text subtitle stream, as information for deciding the reproduction begin time of the text subtitle stream being synchronized with the main data, the sync_PlayItem_id field and the sync_start_PTS_of_PlayItem field may be defined as sync_PlayItem_id=0 and sync_start_PTS_of_PlayItem=t1. More specifically, reproduction of the text subtitle stream using the SubPlayItem begins at a specific point of "t1(PTS)" within PlayItem 1 (PlayItem_id=0).

Secondly, the text subtitle stream uses a counter of 90 kilohertz (khz) as a system time clock. And, an initial value of the counter is the dialog_start_PTS within the first dialog presentation segment (DPS #1), shown in FIG. 7. More specifically, unlike other streams, the text subtitle stream does not have a program clock reference (PCR) as the initial value. Accordingly, all PTS (dialog_start_PTS and dialog_end_PTS) values within subsequent dialog presentation segments (DPS) are decided by counting from the dialog start PTS within the first dialog presentation segment (DPS #1).

Therefore, reproduction of the text subtitle begins starting from the time decided by the sync_PlayItem_id field and the sync_start_PTS_of_PlayItem field. Afterwards, a system time clock counter of 90 kilohertz (kHz), having an initial value identical to that of the dialog_start_PTS within the first dialog presentation segment (DPS #1), is used so as to reproduce each dialog in accordance with the PTS (dialog_start_PTS and dialog_end_PTS) value for each dialog defined within the dialog presentation segment (DPS) included in the text subtitle stream. Thereafter, reproduction ends at dialog_end_PTS within the last dialog presentation segment (last DPS) included in the text subtitle stream.

Figure 9B:
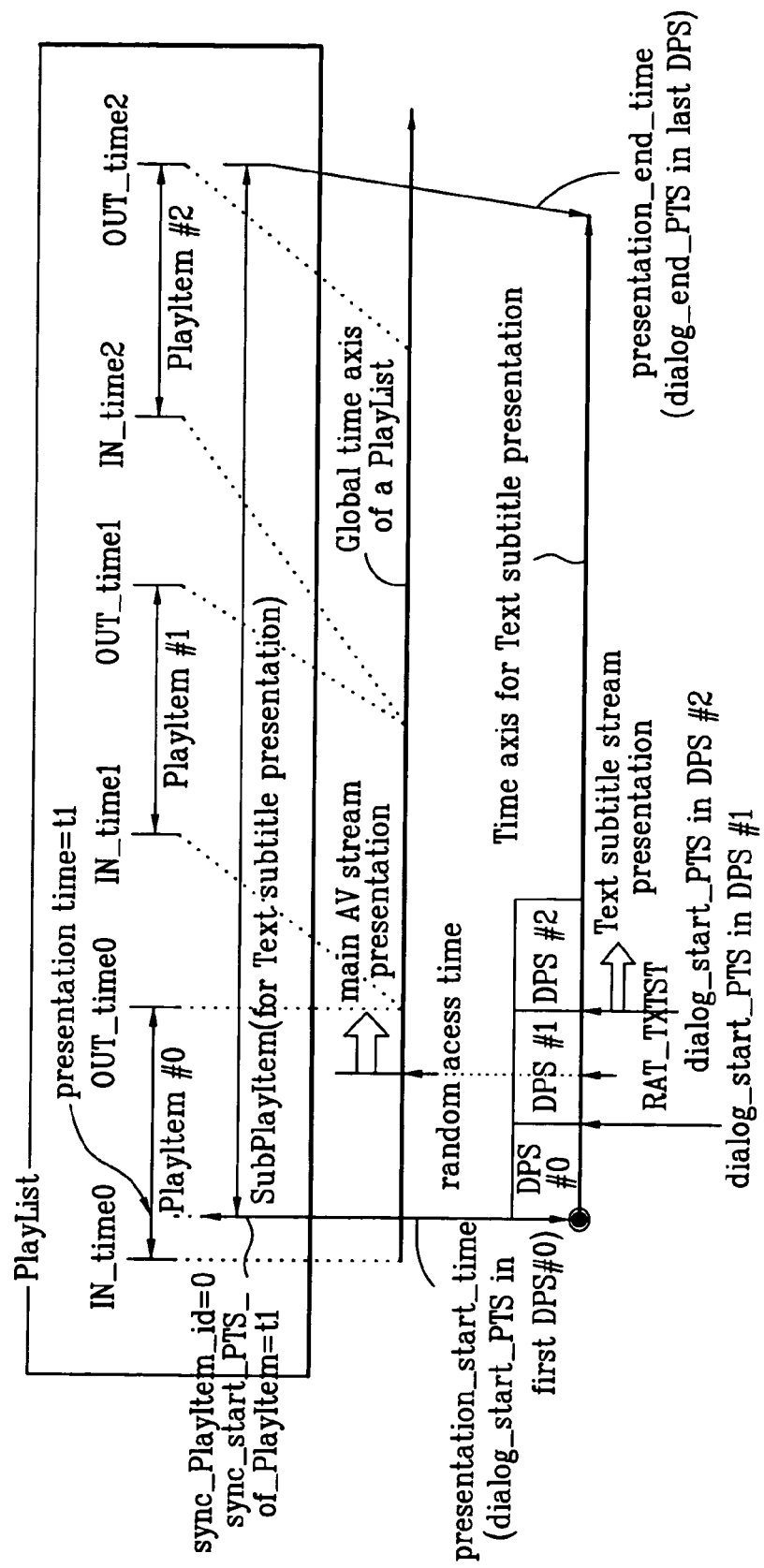
FIG. 9B illustrates a method of carrying out a random access between the text subtitle file and the main AV stream according to the present invention.

Thirdly, referring to FIG. 9B, the text subtitle stream and the main AV stream can be randomly accessed. More specifically, the PlayList file includes a set of time information, which can be identified by the user. The set of time information starts from a presentation start time (e.g., In_time0) within a beginning PlayItem (e.g., PlayItem #0) included in the PlayList file and is defined as a continuous time axis (also referred to as a "global time axis of a PlayList"). For example, as shown in FIG. 9B, when a random access time desired by the user occurs within a reproduction section of PlayItem #0 on the global time axis of a PlayList, the main AV stream is reproduced starting from the random access time. And, as described above, this is because the presentation (or reproduction) time of the PlayItem is identical to the global time axis of a PlayList. Conversely, as described above, the text subtitle stream is synchronized with a specific time (t1) within the main AV stream, which is different from the presentation start (or representation begin) time (In_time0). And so, the text subtitle stream is reproduced on a different time axis (hereinafter referred to as a "time axis of Text subtitle presentation"). Therefore, in order to reproduce the text subtitle stream in synchronization with a random access time desired by the user the following process steps are required.

First of all, a random access time on the global time axis of a PlayList is required to be converted to a time value on the time axis of the Text subtitle presentation (SubPlayItem). Accordingly, the time value on the time axis of Text subtitle presentation can be obtained by subtracting sync_start_PTS_of_PlayItem indicated in the SubPlayItem from the random access time on the global time axis. In order to simplify the description of the present invention, the time value calculated on the time axis of Text subtitle presentation is defined as "RAT_TXTST". Subsequently, the acquired value (RAT_TXTST) is compared with the dialog_start_PTS within each DPS, so as to reproduce the text subtitle stream starting from the first dialog_start_PTS existing after the acquired value (RAT_TXTST). In other words, every dialog presentation segment (DPS) is a random access point within the Text subtitle stream. Therefore, if a PlayList is randomly accessed, a DPS with the closest dialog_start_PTS after the random access time on the time axis of Text subtitle presentation should be presented.

Figure 10:
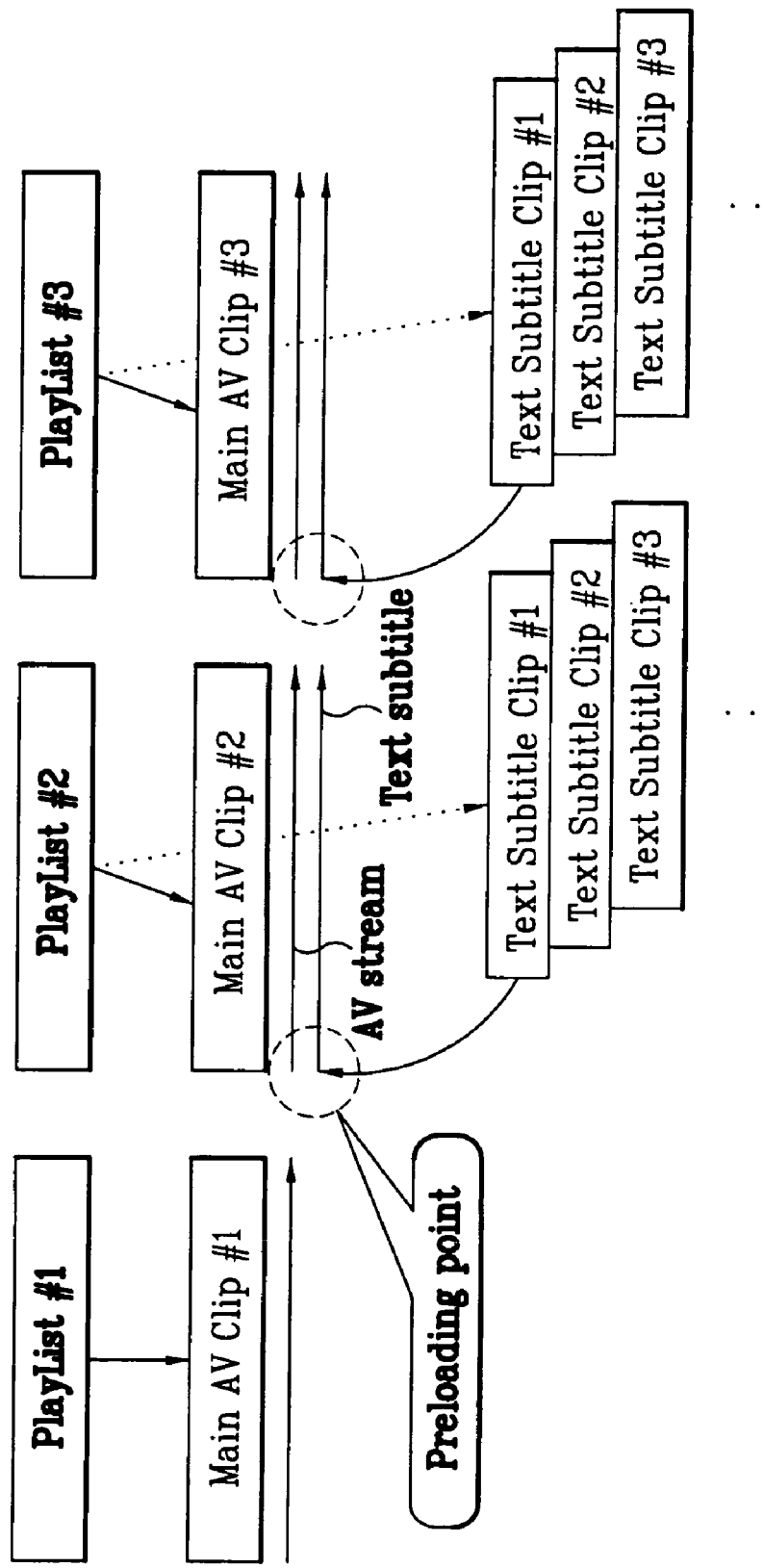
FIG. 10 illustrates a method of preloading a text subtitle stream and corresponding font information when reproducing the text subtitle stream according to the present invention.

FIG. 10 to FIG. 13 illustrate a method and apparatus for reproducing the text subtitle stream according to the present invention and, more specifically, illustrates a method of searching or randomly accessing a specific DPS within the text subtitle stream. FIG. 10 illustrates a method of preloading a text subtitle stream and corresponding font information when reproducing the text subtitle stream according to the present invention. Referring to FIG. 10, the clips being controlled by each of the PlayLists include a main AV clip and a Text subtitle clip. Each of the main AV clips includes a main AV stream and its corresponding control information, and each of the Text subtitle clips is synchronized with the main AV clip. More specifically, the main AV clip is controlled by the PlayItem, and the Text subtitle clip is controlled by the SubPlayItem. Furthermore, each of the PlayItem and the SubPlayItem controls the reproduction of the clips by using the presentation start and end times (IN-time and OUT-time) for each corresponding clip.

Moreover, as described above, a plurality of text subtitle stream (or clips) for each language may be included in a single PlayList. Accordingly, a text subtitle stream of a specific language among a wide range of languages corresponding to the plurality of text subtitles may be converted or transited to a text subtitle stream of another language, depending upon the selection (or choice) of the user. Also, in order to perform a seamless reproduction during the conversion or transition of the text subtitle stream, each of the plurality of text subtitle streams (or clips) is required to be preloaded into a buffer (numeral 10 of FIG. 11). In other words, when all of the text subtitle streams are preloaded into a separate buffer and used, only the text subtitle data may be easily read and used, thereby facilitating the control of the buffer. Conversely, when the text subtitle data and the corresponding font files are not preloaded, the text subtitle data and the corresponding font files that are recorded in separated text subtitle stream files (separated physical areas) should be constantly read during the playback of the PlayList, thereby causing problems in controlling such processes.

At this point, it is preferable that the text subtitle stream that is preloaded into the buffer is created to be equal to or smaller than a pre-determined standardized size. Accordingly, the size of one text subtitle stream representing one set of language information based on a movie having a running time of 2 hours (hrs.) is equal to: 2000 subtitles/movie*2 lines/subtitle*2 line/subtitle*30 characters/line*2 byte/character=240 kB. And, the size of the final buffer is formed by adding an additional 240 kB for creating style information of the above-described text subtitle stream to the size of the text subtitle stream, so that the total size does not exceed about 0.5 MB. Therefore, referring to FIG. 10, when 3 text subtitle streams are to be stored, then 3*0.5 MB=1.5 MB is required. Meanwhile, as shown in FIG. 10, it is preferable that the preloading of the text subtitle stream is performed prior to the playback of the PlayList, at the boundary area in-between PlayLists. In other words, the text subtitle stream should be preloaded in advance before the main AV stream is reproduced.

Figure 11:
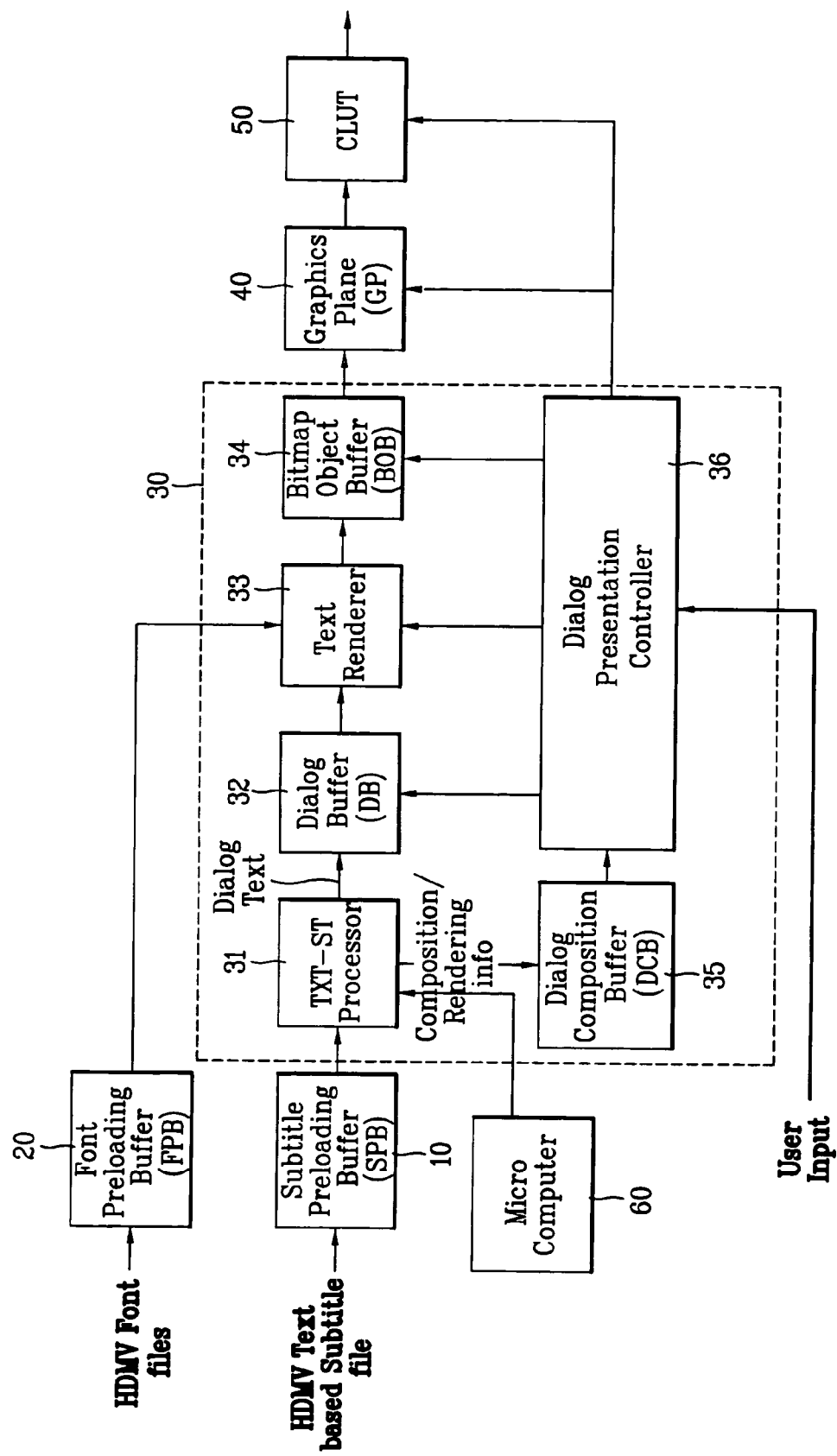
FIG. 11 illustrates a structure of a text subtitle decoder according to the present invention.

FIG. 11 illustrates an apparatus of reproducing text subtitle streams according to the present invention. Referring to FIG. 11, the apparatus includes a subtitle preloading buffer (SPB) 10, a font preloading buffer (FPB) 20, a text subtitle decoder 30, a graphics plane 40, a color look-up table (CLUT) 50, and a microcomputer 60. Herein, an entire portion of a text subtitle stream is preloaded in the subtitle preloading buffer (SPB) 10, and the font information corresponding to the text subtitle stream is preloaded in the font preloading buffer (FPB) 20. The graphics plane 40 is used for adjusting the picture that is being displayed. And, the color look-up table (CLUT) 50 provides control values for adjusting transparency in the form of a table.

A decoding method performed by the apparatus shown in FIG. 11 will now be described in detail. When an optical disc is loaded, the microcomputer 60 reads the file information required for reproducing data streams recorded on the optical disc. Thereafter, when the microcomputer 60 receives a user-specific title reproduction command, the title which the user wishes to reproduce and its corresponding PlayList are reproduced and played-back. More specifically, when the PlayList is played-back, an audio/video decoder (not illustrated) reproduces each of the main AV streams, which are controlled by a PlayItem. And, among the text subtitle streams that are controlled by a SubPlayItem, the stream of a specific language selected by the user, such as a Text Subtitle Clip 1 being created in Korean, is stored in the subtitle preloading buffer 10. Simultaneously, depending upon the font information designated within the Clip information included in the Text Subtitle Clip 1, a specific font file (e.g., aaaaa.font or aaaaa.otf shown in FIG. 1) is read from the optical disc and stored in the font preloading buffer 20.

As described above, when all operations are completed, and when the main AV stream being controlled by the PlayItem is displayed onto the screen, a decoding process of the text subtitle stream is initiated so as to provide the main stream with its corresponding text subtitle. In addition, the decoded text subtitle stream is reproduced simultaneously with the main data at a presentation start time decided from the sync information, which is recorded within the sync_PlayItem_id field and the sync_start_PTS_of_PlayItem field of the SubPlayItem, as shown in FIG. 8.

The microcomputer 60 reads a set of PlayItems and a SubPlayItem included in a PlayList which is recorded on a recording medium. It further reads synchronization information included in the SubPlayItem. Each PlayItem is configured to reproduce at least one main AV stream, and the SubPlayItem is configured to reproduce a text subtitle stream having a plurality of dialog presentation segments, which are preloaded into the SPB 10. The synchronization information indicates a presentation start time of the SubPlayItem on a global time axis of the PlayList. When the PlayList is randomly accessed at a random access time on the global time axis, the microcomputer 60 calculates its corresponding random access time on a time axis of the SubPlayItem by subtracting the presentation start time indicated in the synchronization information from the random access time on the global time axis of the PlayList. Then the text subtitle decoder 30 coupled to the microcomputer 60 start decoding dialog presentation segments stored in the SPB 10, starting from a dialog presentation segment with the closest dialog start time after the random access time on the time axis of the SubPlayItem. The closet dialog start time represents a time which is equal to or immediate after the random access time on the time axis of the SubPlayItem.

The decoding process of the text subtitle decoder 30 includes three steps. In the first step, the text subtitle stream information is separated based upon the object of usage and, more specifically, separated into composition information, rendering information, and Dialog text information. This is referred to as a "parsing step". In order to perform the parsing step, a text subtitle (TXT-ST) processor 31 is provided in the text subtitle decoder 30. The separated composition information and rendering information are stored in a dialog composition buffer (hereinafter referred to as "DCB") 35. And, the separated dialog text information is stored in a dialog buffer (hereinafter referred to as "DF") 32.

In the second step, the text data included in the separated dialog text information is rendered as a set of bitmap data by using the rendering information. Herein, the rendering information refers to style information that is applied when the text subtitle stream is modified to bitmap data. In order to perform the rendering step, a text renderer 33 and a dialog presentation controller 36 should be provided in the text subtitle decoder 30. Then, among the dialog text information that is separated during the parsing step, the text data is rendered as bitmap data. Furthermore, in order to perform the rendering step, the text renderer 33 receives font information that is applied to the corresponding text data from the font preload buffer (FPB) 20, and the text renderer 33 then receives rendering information that is applied to the corresponding text data from the dialog presentation controller 36. Subsequently, the text renderer 33 uses inline style information that is applied to each string of the corresponding text data included in the dialog text, thereby rendering the text data as bitmap data. Thereafter, the text renderer 33 stores the result of the rendering process in a bitmap object buffer (BOB) 34.

In the third and final step, the finally rendered text data, which is the bitmap data, is added to the graphic plane (GP) by using composition information, thereby completing the reproduction of the text subtitle stream. The composition information refers to information designating a display time of the text subtitle onto the screen. In order to perform a composition step, the above-described dialog presentation (DP) controller 36 should be provided in the text subtitle decoder 30. Then, by carrying out the rendering step, the bitmap object that is stored in the bitmap object buffer (BOB) 34 is composed (or created) in the graphic plane (GP) 40 in accordance with the composition information. Most particularly, among the composition information, the palette information is inputted in the CLUT 50 so as to be used as color change information.

As described above, during reproduction, text subtitle streams that are preloaded in the subtitle preloading buffer (SPB) 10 may occasionally have to be searched or randomly accessed, by using a text subtitle stream decoding means, in accordance with a selection and requirement made by the user. And, accordingly, mapping information, which links (or connects) the presentation time stamp (PTS) information having the preloaded text subtitle stream to an address within an actually preloaded buffer. Herein, the mapping information is either created by the optical recording and/or reproducing apparatus itself, or recorded, in advance, in a text subtitle clip information file included in the disc by the author of the disc. The mapping information will be described in more detail with reference to FIG. 12A to FIG. 13.

Figure 12A:
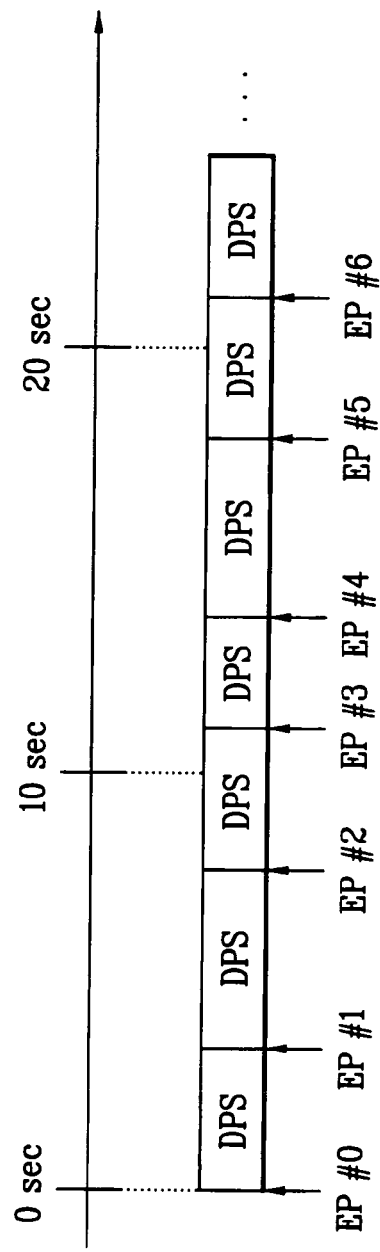
FIGS. 12A and 12B illustrate a mapping table for reproducing the text subtitle stream in the method of reproducing the text subtitle stream according to the present invention.
Figure 12B:
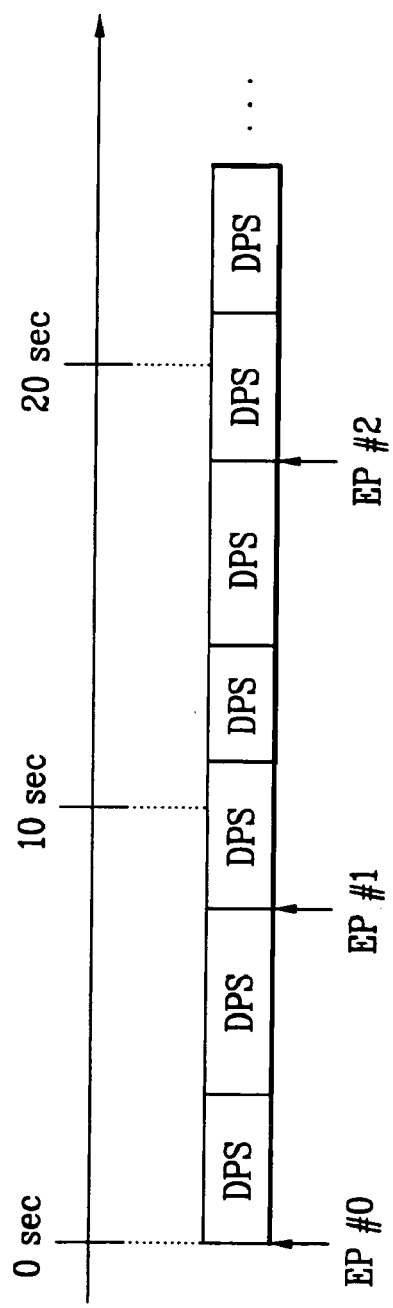

FIGS. 12A and 12B illustrate the method of reproducing the text subtitle stream according to the present invention and, more specifically, illustrate an example when the mapping information is created by the optical recording and/or reproducing apparatus according to the present invention. Referring to FIG. 12A, a text subtitle stream is stored in the subtitle preload buffer (SPB) 10 by DPS units. Each of the stored DPSs is given (or assigned with) an entry point, which is also referred to as a "search point". Accordingly, the entry point is assigned with an address (hereinafter referred to as a "byte number (BN)") in a dialog_start_PTS of a corresponding DPS and a buffer of a corresponding DPS. An "EP_map" or a "search table" controls each of the entry points in a table form.

Therefore, as described in FIG. 9B, when a DPS for a random access of a text subtitle stream is decided, the address (i.e., byte number (BN)) within the buffer 10 having the corresponding DPS preloaded therein is decided on the EP_map. Thus, the text subtitle decoder is enabled to start presentation (or begin reproduction) from the address within the buffer 10. More specifically, the EP_map includes a presentation time stamp (PTS) value of a DPS and a byte number within a buffer for each entry point, thereby facilitating access to a desired position of the text subtitle stream. Accordingly, it is preferable that the EP_map is created at the same time as or prior to the preloading of the text subtitle stream within a buffer.

Furthermore, a maximum of 255 text subtitle clips can be reproduced and controlled within a PlayList file by using a single sub path. And, therefore, the text subtitle clips that are controlled by the same sub path are synchronized with the same main AV stream, each of the clips having a different language or style. Accordingly, in a plurality of text subtitle clips included in the PlayList file, by creating the entry point within the EP_map for each text subtitle stream, modification and conversion between text subtitle streams that are different from one another but synchronized with the same main AV stream can be performed within a shorter period of time.

FIG. 12B illustrates a modified usage of the example shown in FIG. 12A, wherein the entry point is assigned to each plurality of DPSs, instead of being assigned to each DPS. In other words, one entry point may be assigned to each interval of 5 to 10 seconds (secs.) of the reproduction (or presentation) time, and in this case, at least 2 DPSs are included between each entry point. Meanwhile, when reproduction is performed by preloading the text subtitle stream in the buffer 10, and when a text subtitle de-packetizing process is performed after the text subtitle stream is preloaded in the buffer, the entry point should include presentation time stamp (PTS) information and source packet number (SPN) information. This is because the text subtitle stream is stored in the subtitle preload buffer 10 by transport packet units prior to the de-packetization of the text subtitle stream.

Figure 13:
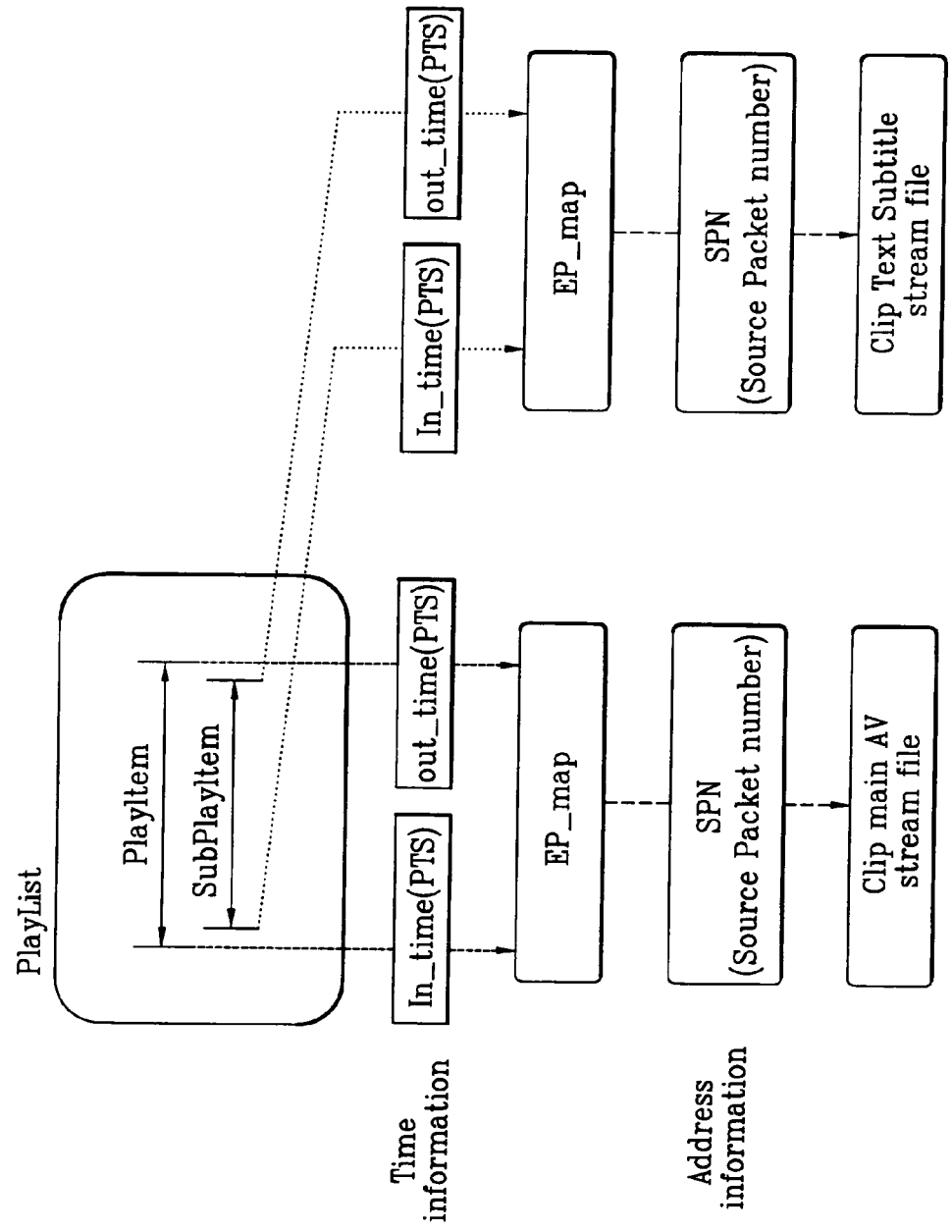
FIG. 13 illustrates a mapping table recorded on an optical disc according to the present invention.

FIG. 13 illustrates the method of reproducing the text subtitle stream according to the present invention and, more specifically, illustrate an example when the mapping information is recorded in the optical disc by the author of the disc. Referring to FIG. 13, the main AV stream within a single PlayList is controlled by a PlayItem included in the PlayList. More specifically, the PlayItem includes a Clip_Information_File_name requiring reproduction control, and time information indicating presentation start time (IN-Time) and presentation end time (OUT-time) of designated clips. Accordingly, by recording EP_map type mapping information within the Clip information file reproduced and controlled by the PlayItem, the PTS information can be converted into a source packet number (SPN) of the main AV stream.

By using the same method, the text subtitle stream is controlled by a SubPlayItem included in the PlayList, wherein the syntax of the SubPlayItem is the same as that described in FIG. 8. More specifically, the syntax of the SubPlayItem includes a Clip_Information_File_name requiring reproduction control, and time information indicating presentation start time (IN-Time) and presentation end time (OUT-time) of designated clips. Accordingly, by recording EP_map type mapping information within the Clip information file reproduced and controlled by the SubPlayItem, the PTS information can be converted into a source packet number (SPN) of the main AV stream. Therefore, since the optical recording and/or reproducing apparatus can read and use the EP_map provided from the Clip information file included in the optical disc, a separate EP_map for the text subtitle stream is not required to be created, as shown in FIGS. 12A and 12B.

As described above, the recording medium, method, and apparatus for reproducing text subtitle streams have the following advantages. The text subtitle stream is synchronized with the main data, and therefore, the text subtitle stream and the main data are reproduced simultaneously, and the text subtitle stream can be randomly accessed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium, comprising:
a PlayList containing one or more PlayItems and at least one SubPlayItem, each PlayItem being configured to reproduce at least one main AV stream, the SubPlayItem being configured to reproduce a text subtitle stream, the SubPlayItem containing synchronization information which indicates a presentation start time of the SubPlayItem on a global time axis of the PlayList, the at least one main AV stream and the text subtitle stream including one or more presentation segments configured such that if the PlayList is randomly accessed at a random access time on the global time axis of the PlayList, one of the presentation segments with a start time directly after a corresponding random access time on a time axis of the text subtitle stream is presented.

2. The recording medium of claim 1, wherein the corresponding random access time on the time axis of the SubPlayItem is calculated by subtracting the presentation start time indicated in the synchronization information from the random access time on the global time axis.

3. The recording medium of claim 1, wherein the SubPlayItem starts its presentation at the presentation start time within a playing time interval of a selected one of the PlayItems.

4. The recording medium of claim 3, wherein the synchronization information includes a first data field indicating a PlayItem identification value of the selected PlayItem, and a second data field indicating the presentation start time of the SubPlayItem on the global time axis.

5. The recording medium of claim 1, wherein the SubPlayItem starts its presentation when presentation of the selected PlayItem has reached to the presentation start time of the SubPlayItem.

6. The recording medium of claim 5, wherein the synchronization information includes a first data field indicating a PlayItem identification value of the selected PlayItem, and a second data field indicating the presentation start time of the SubPlayItem on the global time axis.

7. The recording medium of claim 1, wherein each of the presentation segments includes at least one region of dialog text.

8. The recording medium of claim 7, wherein each of the presentation segments specifies presentation start and end times of the at least one region of dialog text on the time axis of the SubPlayItem.

9. The recording medium of claim 1, wherein the SubPlayItem includes a data field specifying a name of a Clip information file which corresponds to the text subtitle stream.

10. A method for reproducing data recorded on a recording medium, the method comprising:
reading a PlayList recorded on the recording medium, the PlayList containing one or more PlayItems and at least one SubplayItem, each PlayItem being configured to reproduce at least one main AV stream, and the SubPlayItem being configured to reproduce a text subtitle stream and including synchronization information which indicates a presentation start time of the SubPlayItem on a global time axis of the PlayList; and
if the PlayList is randomly accessed at a random access time on the global time axis, presenting a presentation segment with a start time directly after a corresponding random access time on a time axis of the text subtitle stream.

11. The method of claim 10, wherein the corresponding random access time on the time axis of the SubPlayItem is calculated by subtracting the presentation start time indicated in the synchronization information from the random access time on the global time axis.

12. The method of claim 10, wherein the SubPlayItem starts its presentation at the presentation start time within a playing time interval of a selected one of the PlayItems.

13. The method of claim 12, wherein the synchronization information includes a first data field indicating a PlayItem identification value of the selected PlayItem, and a second data field indicating the presentation start time of the SubPlayItem on the global time axis.

14. An apparatus for reproducing data recorded on a recording medium, comprising:
a microcomputer configured to read a PlayList recorded on the recording medium, the PlayList containing one or more PlayItems and at least one SubPlayItem, each PlayItem being configured to reproduce at least one main AV stream, the SubPlayItem being configured to reproduce a text subtitle stream and including synchronization information which indicates a presentation start time of the SubPlayItem on a global time axis of the PlayList; and a text subtitle decoder configured to decode the text subtitle stream, wherein if the PlayList is randomly accessed at a random access time on the global time axis, the microcomputer is configured to control the text subtitle decoder to decode a dialog presentation segment with a start time directly after a corresponding random access time on a time axis of the SubPlayItem.

15. The apparatus of claim 14, wherein the microcomputer is configured to calculate the corresponding random access time on the time axis of the SubPlayItem by subtracting the presentation start time of the SubPlayItem from the random access time on the global time axis.

16. The apparatus of claim 14, wherein the microcomputer is configured to control a presentation of the SubPlayItem to be started at the presentation start time within a playing time interval of a selected one of the set of PlayItems.

17. The apparatus of claim 16, wherein the microcomputer is configured to read the SubPlayItem including the synchronization information including a first data field indicating a PlayItem identification value of the selected PlayItem, and a second data field indicating the presentation start time of the SubPlayItem on the global time axis.

18. A method for reproducing data recorded on a recording medium, the method comprising:

reading a set of PlayItems and a SubPlayItem included in a PlayList recorded on the recording medium, each PlayItem being configured to reproduce at least one main AV stream, the SubPlayItem being configured to reproduce a text subtitle stream loaded to a buffer and including synchronization information indicating a presentation start time of the SubPlayItem on a global time axis of the PlayList;

if the PlayList is randomly accessed at a random access time on the global time axis, calculating its corresponding random access time on a time axis of the SubPlayItem;

selecting a data location from an entry point (EP) map, the selected data location corresponding to a presentation time stamp directly after the calculated random access time on the time axis of the SubPlayItem; and presenting a presentation segment stored in the selected data location within the buffer.

19. The method of claim 18, wherein the corresponding random access time on the time axis of the SubPlayItem is calculated by subtracting the presentation start time indicated in the synchronization information from the random access time on the global time axis.

20. The method of claim 18, wherein the SubPlayItem starts its presentation at the presentation start time within a playing time interval of a selected one of the PlayItems.

21. The method of claim 20, wherein the synchronization information includes a first data field indicating a PlayItem identification value of the selected PlayItem, and a second data field indicating the presentation start time of the SubPlayItem on the global time axis.

22. A recording medium, comprising:

a text subtitle stream configured to be reproduced synchronously with a main data stream, the text subtitle stream including one or more presentation segments; and a PlayList including at least one PlayItem managing reproduction of the main data stream and at least one SubPlayItem managing reproduction of the text subtitle stream, one of the presentation segments with a presentation start time directly after a random access time, corresponding to a random access time at which the PlayList is randomly accessed, on a time axis of the text subtitle stream being configured to be presented if the PlayList is randomly accessed.

23. The recording medium of claim 22, wherein the SubPlayItem starts its presentation at the presentation start time within a playing time interval of a selected one of the PlayItems.

24. The recording medium of claim 22, wherein the SubPlayItem starts its presentation when presentation of the selected PlayItem has reached the presentation start time of the SubPlayItem.

25. The recording medium of claim 22, wherein each of the presentation segments specifies presentation start and end times of the at least one region of dialog text on the time axis of the SubPlayItem.

26. A method of reproducing data recorded on a recording medium, the method comprising:

reading a PlayList including at least one PlayItem managing reproduction of at least one main data stream and at least one SubPlayItem managing reproduction of at least one text subtitle stream, the text subtitle stream including one or more presentation segments and reproduced synchronously with the main data stream; and if the PlayList is randomly accessed, searching a random access point from the text subtitle stream and presenting the random access point, the random access point being one of the presentation segments with a presentation start time directly after a random access time at which the PlayList is randomly accessed.

27. The method of claim 26, wherein the SubPlayItem starts its presentation at the presentation start time within a playing time interval of a selected one of the PlayItems.

28. The method of claim 26, wherein the SubPlayItem starts its presentation when presentation of the selected PlayItem has reached the presentation start time of the SubPlayItem.

29. The method of claim 26, wherein each of the presentation segments specifies presentation start and end times of the at least one region of dialog text on the time axis of the SubPlayItem.

30. An apparatus for reproducing data recorded on a recording medium, comprising:

a controller configured to control a text subtitle stream including one or more presentation segments to be reproduced synchronously with a main data stream, the text subtitle stream and the main data stream managed by a PlayList including a PlayItem and a SubPlayItem, and if the PlayList is randomly accessed, the controller being configured to search a random access point from the text subtitle stream and control the random access point to be presented, wherein the controller is configured to control one of the presentation segments with a presentation start time directly after a random access time at which the PlayList is randomly accessed to be presented as the random access point.

31. The apparatus of claim 30, wherein the controller is configured to control the SubPlayItem starting its presentation at the presentation start time within a playing time interval of a selected one of the PlayItems.

32. The apparatus of claim 30, wherein the controller is configured to control the SubPlayItem starting its presentation when presentation of the selected PlayItem has reached to the presentation start time of the SubPlayItem.

33. The apparatus of claim 30, wherein the controller is configured to control each of the presentation segments specifying presentation start and end times of the at least one region of dialog text on the time axis of the SubPlayItem.

* * * * *